United States Patent
Thomas et al.

(12) 
(10) Patent No.: US 6,687,793 B1
(45) Date of Patent: Feb. 3, 2004

(54) METHOD AND SYSTEM FOR OPTIMIZING RESOURCES FOR CACHE MANAGEMENT

(75) Inventors: David Thomas, Austin, TX (US); Scott Wells, Austin, TX (US)

(73) Assignee: Vignette Corporation, Austin, TX (US)

( * ) Notice: Subject to any disclaimer, the term of this patent is extended or adjusted under 35 U.S.C. 154(b) by 193 days.

(21) Appl. No.: 10/034,712

(22) Filed: Dec. 28, 2001

(51) Int. Cl.$^7$ .......................... G06F 12/00; G06F 13/00
(52) U.S. Cl. ..................... 711/133; 711/100; 711/118; 711/154
(58) Field of Search .................. 711/100, 118, 711/133, 136, 154, 167

(56) References Cited

U.S. PATENT DOCUMENTS

| | | | |
|---|---|---|---|
| 5,202,982 A | | 4/1993 | Gramlich et al. ............ 395/600 |
| 5,473,772 A | | 12/1995 | Halliwell et al. ............ 395/650 |
| 5,504,879 A | | 4/1996 | Eisenberg et al. ............ 395/600 |
| 5,611,046 A | * | 3/1997 | Kantz et al. ................ 711/146 |
| 5,740,430 A | | 4/1998 | Rosenberg et al. .......... 395/616 |
| 5,742,789 A | * | 4/1998 | Ofer et al. .................. 711/111 |
| 5,745,737 A | * | 4/1998 | Kayes et al. .................. 703/13 |
| 5,860,100 A | * | 1/1999 | Feiste et al. ................ 711/135 |
| 6,029,175 A | * | 2/2000 | Chow et al. ............. 707/104.1 |
| 6,446,128 B1 | * | 9/2002 | Woods et al. ................ 709/229 |

OTHER PUBLICATIONS

Dasgupta, Partha, "Resource Location in Very Large Networks," IEEE, pp. 156–163, May 1994.

Vetter, Ronald, J., "Mosaic and the World–Wide Web," IEEE, pp. 49–57, Oct. 1994.

Obraczka et al., "Internet Resource Discovery Services," IEEE, p. 8–22, Sep. 1993.

Sharma et al., "Hypertext Based Distributed Object Management for Information Location and Retrieval," IEEE, pp. 102–107, 1993.

wysiwyg://101/http://msdn.microsof....brary/wcedoc/wces-ecur/crypto$_{13}$1.htm, pp. 1–2, 2001.

Turley, "Design Specification for Packaged Application Support in Assassin," pp. 2–6, 1999.

Turley, Functional Specification for Packaged Application Support in Assassin, pp. 2–6, 1999.

* cited by examiner

*Primary Examiner*—Tuan V Thai
(74) *Attorney, Agent, or Firm*—Gray Cary Ware & Freidenrich, LLP

(57) ABSTRACT

The present invention provides a system and method for optimizing a cache that substantially eliminates reduces the disadvantages of previously developed cache management systems. More particularly, embodiments of the present invention provide a system of optimizing a cache by polling cached assets with a frequency dependent of the relative activity of a cached asset. An embodiment of the method of the system includes the steps of: (i) polling a cached asset according to a first schedule to determine if the cached asset has been active within a first predefined period of time; (ii) if the cached asset has not been active, polling the cached asset according to a second schedule to determine if the cached asset has been inactive for at least a second predefined period of time; (iii) demoting the cached asset to less active status; and (iv) if the cached asset has been inactive for at least within the second predefined period of time, demoting the cached asset to inactive status. In one embodiment of the present invention, if the cached asset has been active within the second predefined period of time, the cached asset can again be polled according to the first frequency. The frequency with which the cached asset can be polled according to the first and second schedule can be a matter of optimization. Polling according to the first schedule can occur at a greater frequency than polling according to the second schedule. Thus, more active assets can be polled more often than less active assets.

45 Claims, 3 Drawing Sheets

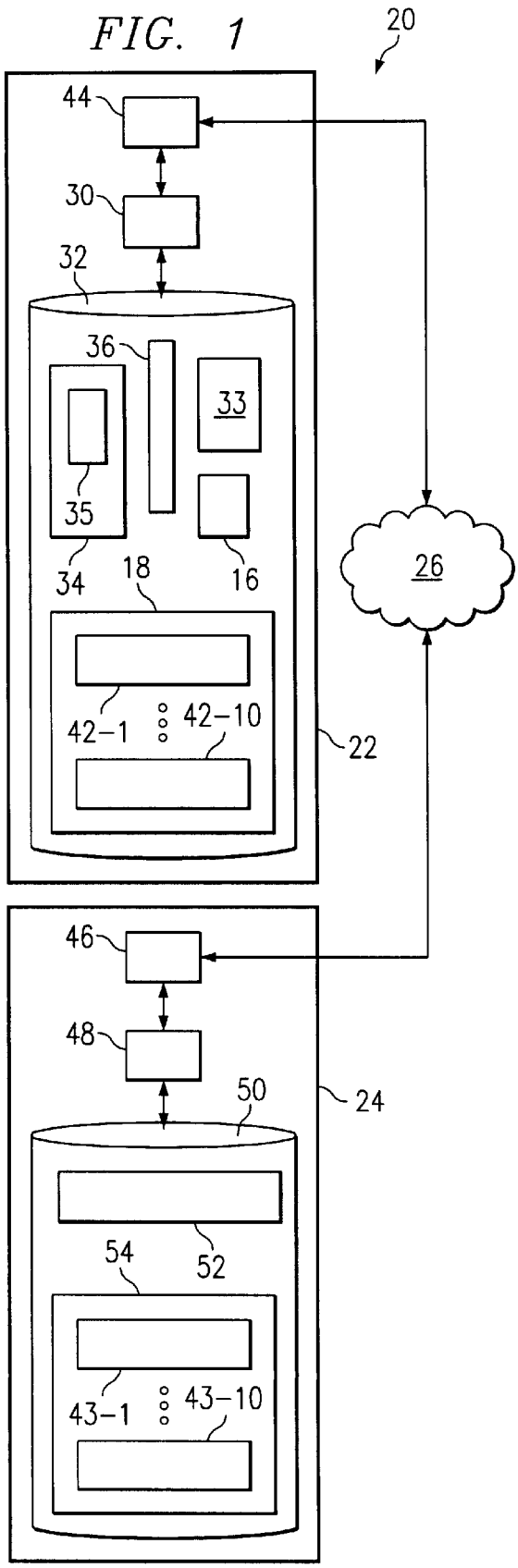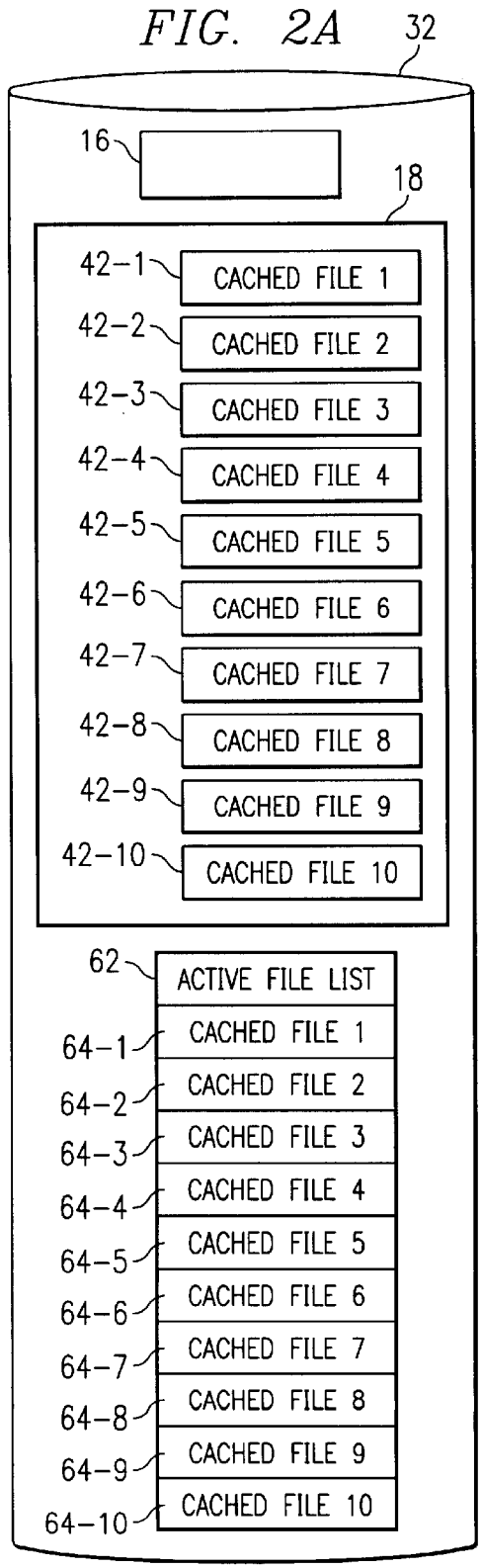

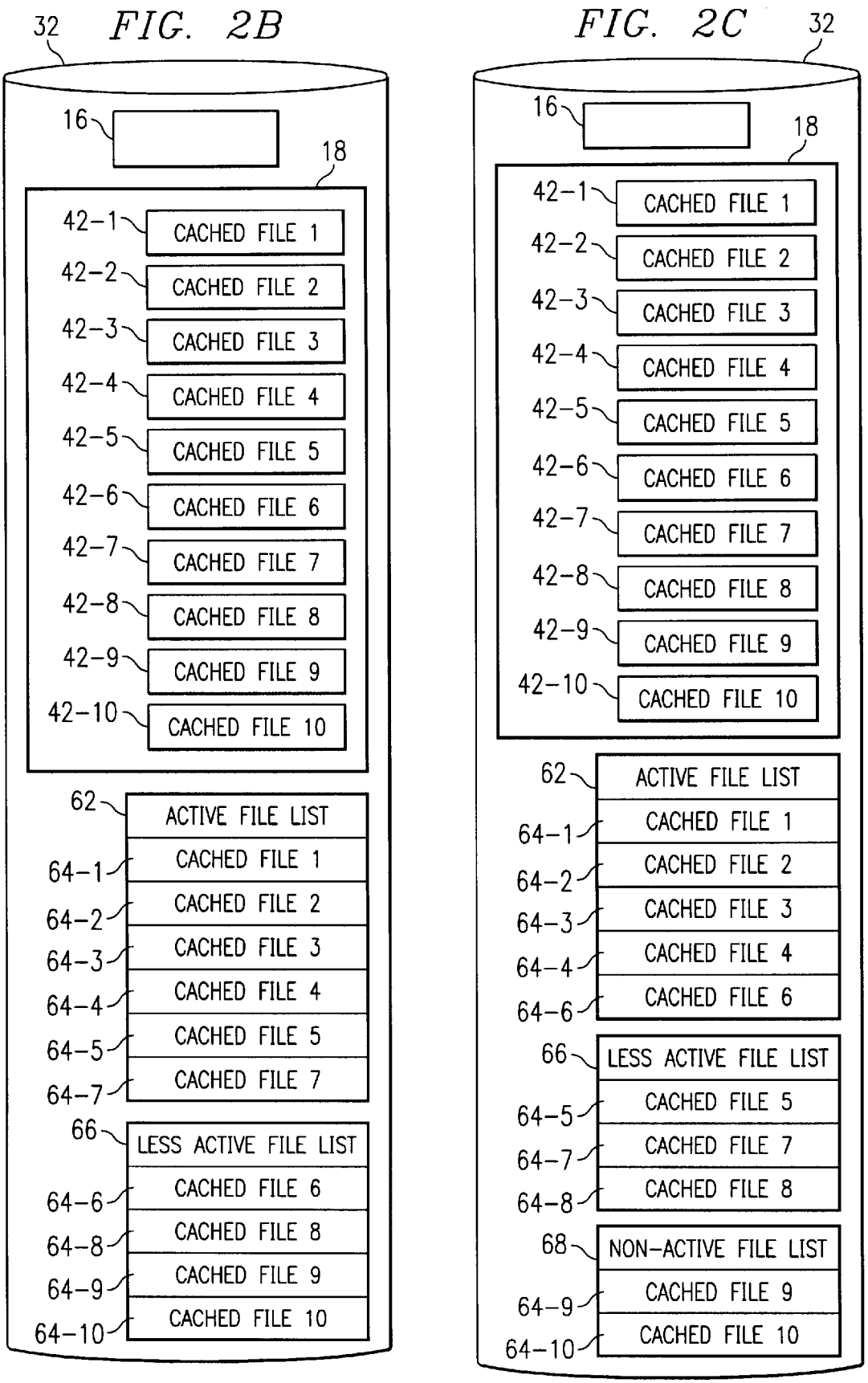

METHOD AND SYSTEM FOR OPTIMIZING RESOURCES FOR CACHE MANAGEMENT

TECHNICAL FIELD OF THE INVENTION

This invention relates generally to cache management. More particularly, the present invention relates to methods and systems for the optimization of system resources during cache management. Even more particularly, the present invention relates to a system and method for polling assets in a cache at different frequencies depending upon the relative activity of the assets.

BACKGROUND OF THE INVENTION

A cache is essentially a buffer between a high-speed system and a low-speed system. Caches are becoming increasingly important for use in computers and computer systems in which there may be several devices running at different speeds. Even in a single computer, caches may be necessary to optimize performance. For example, in the common desktop personal computer ("PC"), there are typically many different layers or levels of cache. Level 1 or primary cache is the fastest cache in the PC and is typically built into the central processing unit ("CPU") (level 1 cache is also called "internal" cache as it is integrated directly with the CPU). Although this cache is generally very small (e.g., under 100 KB) it runs at or near the CPU speed. Level 1 cache is used to store the highest priority and most often accessed instructions. Because the most commonly used instructions are stored in Level 1 cache, that runs at or near the same speed as the CPU, they can be accessed quickly and easily by the CPU.

While it may be desirable to store all commonly used instructions in such a fast memory, such memory is prohibitively expensive. Therefore, other commonly used instructions can be stored in level 2 cache. Level 2 cache can typically store a greater number of instructions than level 1 cache (e.g., can store more than 1 MB) but is slightly slower. If an instruction cannot be found in the level one cache, the CPU will look for the instruction in the level 2 cache. In addition to storing instructions in level 1 and level 2 cache, commonly accessed instructions can also be stored in system RAM, which is slightly slower than level 1 or level 2 cache, but is significantly faster than a hard disk drive or floppy disk drive, where instructions would otherwise be stored.

By storing commonly accessed instructions in various levels of cache, a computer's performance can be significantly increased. This is because during the execution of a program the same instructions are typically accessed repeatedly. By storing the most accessed instructions in the highest speed cache (e.g., level 1 cache) and so on, the CPU can access the instructions at the speed of the respective cache rather, than at the speed of, for example, a relatively slow disk drive. Thus, the use of various levels of cache can significantly enhance computer performance.

Caches are not only useful to buffer instructions between internal components of a computer, but can also be used to buffer files exchanged between systems that have different access speeds. For example, caching is a commonly employed tool for displaying web pages over the Internet. When a user accesses a web page via the Internet, the speed at which a page can be downloaded to his/her computer is typically dictated, not by processor speed or available system RAM, but instead by the speed of the connection between the user's computer and the web server at which the web page resides. In order to increase the speed at which pages are downloaded, many Web browsers can cache commonly downloaded web pages or components of web pages. For example, the user's Web browser could cache images from the web page that are repeatedly accessed, such as buttons or banners, on the user's hard disk drive. When the user attempts to download the same web page or related web pages that use the same buttons and/or banners, the buttons or banners can be downloaded from the hard disk drive rather than from the Web server (i.e., over the much slower network connection), thereby significantly decreasing the download time.

Similarly, a cache can be used to increase the speed with which files on a database ("database assets") can be accessed and modified. In current systems, when a user requests a database asset from a database, a copy of the database asset is sent to the user's computer and can be cached on the user's hard disk drive. When the user accesses or modifies the database asset, he/she, in some applications, accesses the cached file on the hard drive and not the database asset stored on the database. Again, because the file is accessed from the hard disk drive and not over a relatively slow network connection, the file can be accessed and modified much more quickly. When the user has completed work on the cached file, the cached filed can be reconciled or synchronized with the file on the database For example, in the manner described in related U.S. patent application Ser. No. 10/033,242, entitled "System and Method for Synchronization of a File in a Cache," filed on Dec. 28, 2001 now pending, by inventors David Thomas and Scott Wells (the "Synchronization Application") which is hereby fully incorporated by reference.

For file caches (e.g., caches that contain files rather than instructions), particularly for those associated with databases and/or the Internet, cache management presents several difficulties. One such difficulty is that if many files are cached, the memory that stores the cache can eventually become saturated (i.e., reach capacity). Therefore, a cache management program must be implemented to delete files from the cache. In current systems, the cache management program is typically integrated into the application or program that actually accesses files from the cache. Thus for example, a typical database synchronization program (e.g., a program that synchronizes cached files on a user's computer with database assets in a database) or Internet browser will have a cache management aspect to manage the cache of database or Internet files on the user's computer. In these systems, the cache management program generally maintains a list of cached files and periodically removes files from the cache. These systems, however, have significant shortcomings because the cache management portion of this software must be subsumed by another program. In order to manage the cache, the cache management program must receive detailed contextual information, such as when a particular file was last accessed or last modified from another portion of the same software program. Furthermore, synchronization programs are typically designed for use with only one application, limiting the usefulness of a cache management program associated with the synchronization program. Thus, the cache management portion can typically only manage files associated with the overall program of which the cache management program is a part.

Additionally, current cache management systems generally do not optimize system resources. Typically, the cache management system will review the list of cached files on a predetermined frequency. As the list of cached files grows, reviewing the list will take progressively longer. The current cache management systems, however, do not account for the fact that some files in the cache may be less active than others. Therefore, reviewing less active files can consume as many, if not more, system resources as reviewing active files.

SUMMARY OF THE INVENTION

The present invention provides a system and method for optimizing a cache that substantially eliminates or reduces the disadvantages of previously developed cache management systems. More particularly, embodiments of the present invention provide a method and system for optimizing a cache by polling cached assets with a frequency that can be dependent on the relative activity of the cached asset being polled. One embodiment of the method of the present invention includes the steps of: (i) polling a cached asset according to a first schedule to determine if the cached asset has been active within a first predefined period of time; (ii) if the cached asset has not been active for at least the first predetermined period of time, demoting (e.g., giving the asset a status so that the asset is polled less frequently or not at all) the cached asset to less-active status and polling the cached asset according to a second schedule to determine if the cached asset has been active within a second predefined period of time; and (iii) if the cached asset has not been active for at least the second predefined period of time, demoting the cached file to an inactive status. According to one aspect of the present invention, a cached asset that has been demoted to inactive status can be removed from the cache. In one embodiment of the present invention, if the cached asset has been active within the second predefined period of time, the cached asset can again be polled according to the first frequency (e.g., can be promoted to active status). The frequency with which the cached asset can be polled according to the first and second schedule can be a matter of optimization. Polling according to the first schedule can occur at a greater frequency than polling according to the second schedule. Thus, more active files can be polled more often than less active files.

Embodiments of the present invention provide a technical advantage over previously developed cache management systems by providing the ability to manage a cache without detailed contextual information about the cached assets. Thus, the present invention can be implemented to more efficiently manage a cache containing a large variety of asset types.

Embodiments of the present invention provide another advantage by being able to manage a cache without being subsumed by another software program. Thus, the present invention can be used to manage a cache of assets that are accessed by multiple software applications.

Yet another advantage provided by embodiments of the present invention is the ability to poll active assets more frequently than less active assets, thereby saving significant system resources and improving performance. This can also reduce latency between changes to an asset at the cache and updates to a corresponding asset on another system (e.g., a database).

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein:

FIG. 1 illustrates a computer network that can utilize a cache manager according to one embodiment of the present invention;

FIGS. 2A through 2C provide diagrammatic representations illustrating the polling of a cache according to one embodiment of the present invention.

DETAILED DESCRIPTION OF THE INVENTION

Figure 3:
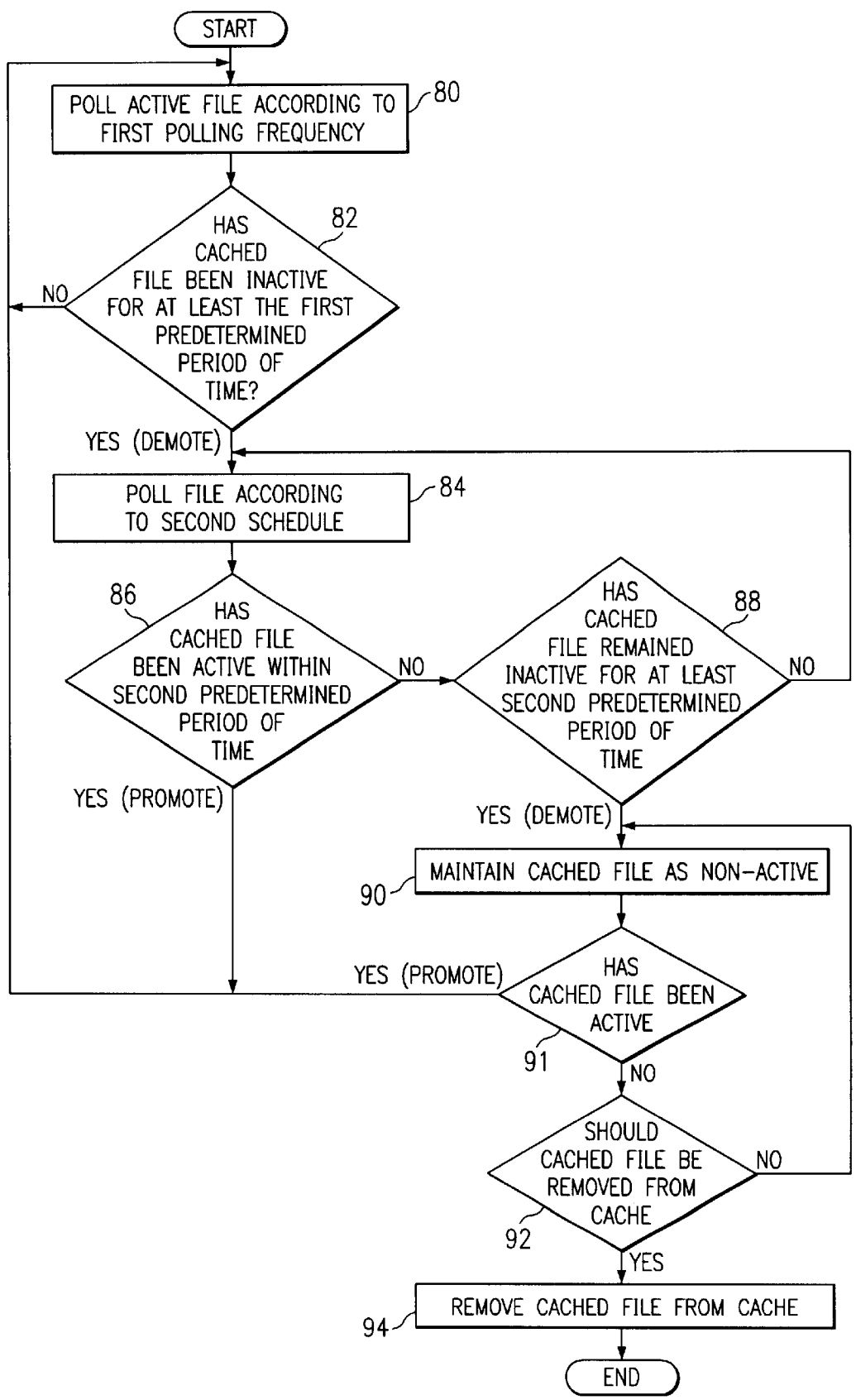
FIG. 3 is a flow chart illustrating one embodiment of a method for managing a cache according to the present invention.

Preferred embodiments of the present invention are illustrated in the FIGUREs, like numerals being used to refer to like and corresponding parts of the various drawings.

Embodiments of the method and system of the present invention provide the capability to manage and optimize a cache. In particular, embodiments of the present invention provide the ability to survey or poll assets in a cache that have recently been active at a higher frequency, while polling those assets in the cache that have been less active at a lower frequency. By polling relatively inactive assets less frequently, significant system resource savings can be achieved.

For the sake of explanation, embodiments of the present invention will be described in the context of managing cached files that are associated with assets in a database. However, this example is by no means limiting of the present invention as the present invention is equally applicable to managing a variety of cached digital assets including images, videos, audio files, documents, source code, compiled files and so on, in distributed or non-distributed systems.

FIG. 1 illustrates a computer network 20 that can utilize a cache manager 16 operated in accordance with the teachings of the present invention to optimize cache 18. Network 20 can include at least one client computer 22 and at least one server computer 24. Client computer 22 and server computer 24 can be connected via a network 26, which can comprise any wire or wireless network, including global computer networks such as the Internet. Client computer 22 can be a personal computer, a workstation, a wireless device, a laptop computer, or any other computing device operable to access data from a database. Client computer 22 can include a central processing unit 30 ("CPU" 30) connected to a computer-readable memory 32. Memory 32 can comprise any combination of system RAM 33, ROM and/or magnetic storage device(s), such as a hard drive. Furthermore, while in FIG. 1 memory 32 is shown to be connected locally to CPU 30 at client computer 22, memory 32 need not be local and can be distributed between several devices. As noted earlier, embodiments of the present invention can also manage digital assets stored in a non-distributed system.

Memory 32 can store a number of computer programs executable by a computer processor (e.g., CPU 30), including an operating system 34 having a file management system 35, various applications 36 that can comprise software tools, such as word processing tools and other software tools known to those in the art. Memory 32 can also store a cache manager 16. As would be understood by those of ordinary skill in the art, operating system 34 can provide a software platform upon which other programs, such as applications 36 and cache manager 16 run. File management system 35 can be used by operating system 34 to organize and keep track of files. In one embodiment of file management system 35, file management system 35 can be a hierarchical file system that uses directories to organize files into a tree structure having various nodes to represent directories and files. Memory 32 can also include cache 18 which can contain cached versions of database assets, such as cached files 42-1 . . . 42-10. As will be discussed in greater detail below, each cached file 42-1 . . . 42-10 can be a cached version, either modified or unmodified, of a database assets 43-1 . . . 43-10, respectively. Client computer 22 can establish network communication through a standard network connection device 44. Network connection device 44 can be any compatible network connection device that is known to those in the art. Again, while embodiments of the present invention are described in regard to managing cached files, those embodiments are not limiting of the scope of the present invention and, as would be understood by one of ordinary skill in the art, other embodiments of the present invention can manage other forms of cached assets.

Server computer 24 can comprise standard server computer components, including a server network connection device 46, a CPU 48, and a primary and/or secondary memory 50. Network connection device 46, CPU 48 and memory 50 can be equivalent components to network connection device 44, CPU 30 and memory 32 of client computer 22. Memory 50 can store database management program 52, which can be executable to carry out standard database functions, including receiving requests for data, retrieving the data, and returning the data to the requesting computer. Memory 50 can also include a database 54 which can comprise various database assets, such as database assets 43-1 . . . 43-10. The database assets 43-1 . . . 43-10 can include a variety of different file types, including, but not limited to, text files, spreadsheet files, graphics files, audio, graphic html files, etc.

It should be noted that the system architecture illustrated in FIG. 1 is exemplary only and is designed to give context to the embodiments of the present invention. However, various embodiments of cache manager 16 can be implemented with different architectures of client computer 22 and server computer 24. Furthermore, while cache manager 16 will be discussed primarily in conjunction with managing a file cache for database files, embodiments of cache manager 16 can be used in any system that manages cached assets.

Returning to FIG. 1, in operation, a user wishing to access a database asset (e.g., database asset 43-1) can establish a connection through a standard network application, as is known to those in the art, with a server (e.g., server computer 24) associated with the database (e.g., database 54) on which the database asset (e.g., database asset 43-1) is stored. Once the user has established a connection to server computer 24, cache manager 16 can determine the contents of database 54 and can display a representation of the contents in, for example, a graphical user interface, or can enumerate the contents for display by an external graphical user interface. The user can select a database asset in which he/she is interested from the graphical user interface. When the user selects a database asset (e.g., database asset 43-1) by, for example, double clicking on the database asset in the graphical user interface, a request can be sent to server computer 24 for that database asset. Database management program 52 will receive the request, search database 54 for database asset 43-1, retrieve database asset 43-1, and communicate a copy of database asset 43-1 to client computer 22. Typically, a copy of database asset 43-1 is also maintained on database 54.

Upon receiving the copy of database asset 43-1 at client computer 22, cache manager 16 can save database asset 43-1 as a cached file 42-1 in memory 32. In addition, cache manager 16 can associate cached file 42-1 with a particular connection (e.g., with a particular database) so that if the user is accessing multiple databases over multiple connections, cache manager 16 can keep track of the database from which database asset 43-1 was obtained. Cache manager 16 can also associate cached file 42-1 with a unique location on memory 32. Assume, for example, that database asset 43-1 is the image file "myfile.jpg." When the user requests myfile.jpg, cache manager 16 can request the file from server computer 24. Database management program 52 can search database 54 for myfile.jpg, retrieve myfile.jpg, and send a copy of myfile.jpg to client computer 22, while retaining a copy on database 54. Cache manager 16 can receive myfile.jpg and associate myfile.jpg with database 54. Cache manager 16 can also save myfile.jpg as cached file 42-1 in cache 18 and associate myfile.jpg with a unique location in memory 32. As an example, cache manager 16 can store myfile.jpg on a hard disk drive as C:\cache\myfile.jpg. Over a period of time (for example, over a work day), the user may access many files from various databases. Thus, the size of cache 18 will continue to grow and the number of cached files can become extremely large.

A user can access the cached files using application 36, which can be any suitable application known in the art. As would be understood by those of ordinary skill in the art, when the user opens a cached file, application 36 will typically open the cached file, copy the cached file into system RAM 33, and close the cached file. The user can then view or modify the copy of the cached file 42-1 stored in system RAM 33. When the user modifies the cached file 42-1 (e.g. as resident in RAM 33) and saves the file, application 36, can write the modification from RAM 33 back to cache 18 (e.g., can update cached file 42-1 in cache 18). As noted earlier, in prior art systems, cache manager 16 is typically subsumed by a particular application 36 such as a web browser. Therefore, cache manager 16 would have detailed knowledge of when a cached file 42 is written back to cache 18 (e.g., when cached file 42-1 is saved by application 36). However, there may be cases in which cache manager 16 cannot receive direct notification from application 36 or from file management system 35 that a cached file has been saved.

The Synchronization Application discloses one embodiment of a system for synchronizing a database in which a cache manager is not subsumed by application 36 and can manage cached files that are associated with many different applications 36. As described in the Synchronization Application, if the cache manager cannot receive direct notifications from file management system 35 or application 36 as to when a particular file is saved, the cache manager can poll the cached file to determine if the file has been modified within a specific period of time.

While the Synchronization Application describes at least one system in which a cache manager 16 polls the cached file 42-1 to determine if changes have been made to cached file 42-1, it should be understood that this is provided by way of example only and that the teachings of the present invention are generally applicable to any system in which polling of a cache occurs.

As noted before, when an application 36 opens a cached file 42, application 36 typically stores cached file 42-1 in system RAM 33 and closes cached file 42-1. If cache manager 16 simply monitored cached file 42-1 for opening and closing, it would appear that cached file 42-1 was only open for a very short period of time (e.g., the amount of time it takes to copy cached file 42-1 into system RAM 33). Additionally, it is possible in many current applications 36, such as Microsoft™ Word, to close a file but keep the application open. Thus, monitoring opening and closing of application 36 will not reflect modification to cached file 42. Because cache manager 16 does not receive direct notifications of when a cached file 42 is saved from application 36 or file management system 35, and because monitoring either the opening and closing of cached filed 42-1 or application 36 will not detect all modifications to cached file 42-1, cache manager 16 can, as will be described in greater detail below, poll the cached files to determine if the cached files have been modified.

In accordance with the teachings of the present invention, cache manager 16 can poll cached assets (e.g., cached files) stored in cache 18. Cache manager 16, for each file in cache 18, can read a time stamp associated with the cached file to determine when the cached file was last accessed or modified. As would be understood by those of ordinary skill in the art, time stamps are attributes of the cached files stored by file management system 35 each time a file is accessed and/or saved. Cache manager 16 can poll files that have shown recent activities (e.g., the time stamp associated with the cached file indicated the cached file has been modified within a certain period of time) at a high frequency while polling those files that indicate less activity (e.g., cached files with associated time stamps that have not been modified for greater than a preset period of time) with lesser frequency. Because files that are less active are polled less frequently, client computer 22 can use fewer resources to poll cache 18 than if all the files were polled at the same frequency.

FIGS. 2A through 2C provide diagrammatic representations illustrating the polling of cache 18 according to one embodiment of the present invention. Cache manager 16 can maintain a cache 18 of cached files (labeled 42-1 through 42-10) on memory 32. Cache manager 16 can also maintain an active list 62 in memory 32 of cached files which have recently been active (e.g., have been accessed or modified within a first predetermined period of time, as will be described in greater detail below). As illustrated in FIG. 2A, active list 62 can include entries 64-1 through 64-10 corresponding to each cached file 42-1 through 42-10. It is assumed, for the sake of explanation, that in FIG. 2A each cached file 42-1 through 42-10 has recently been active (has been accessed and/or modified within a first predetermined period of time) and therefore each file has an associated file entry 64 in active list 62. This could occur, for example, if each file 42-1 through 42-10 had recently been opened, as might typically occur when an employee opens files from a database at the beginning of a work day. Whether a file is considered recently active or not can be, as will be discussed below, a matter of tuning and optimization.

In operation, cache manager 16 can read active list 62 and poll files with associated file entries 64 at a predetermined frequency. During polling, cache manager 16 can read a time stamp from the file attributes associated with each file 42-1 through 42-10. The time stamp can comprise a last-modified time stamp and/or a last-accessed time stamp. As would be understood by those of ordinary skill in the art, these time stamps are typically supplied by a file management system (e.g., file management system 35) whenever a file is opened or modified. Thus, each set of file attributes for a file can, in one embodiment of the present invention, include a last-modified and/or a last-accessed time stamp. Cache manager 16 can read the time stamps for each cached file 42-1 . . . 42-10 to determine if the file has either been accessed or modified within a first predetermined period of time. For example, cache manager 16 could read the time stamps associated with each cached file 42-1 . . . 42-10 to determine if each cached file 42-1 . . . 42-10 has either been modified or accessed within the last three hours. If a file has not been accessed or modified for at least the predetermined period of time (e.g., three hours), that file can be demoted to a less active status as shown in FIG. 2B.

As illustrated in FIG. 2B, cache manager 16 can also maintain a less active file list 66 of less active files. If, for example, during polling based on active file list 62, it is determined that files 42-6, 42-8, 42-9, and 42-10 have not been accessed or modified for at least the first predetermined period of time (e.g., three hours), these files can be demoted to the less active list 66 as represented by the fact that file entries 64-6, 64-8, 64-9, and 64-10 are now included in less active file list 66. Because files listed in less active file list 66 have exhibited less activity, these files can be polled less frequently (e.g., according to a second schedule) than files in active list 62. Thus, for example, cache manager 16, in accordance with FIG. 2A, could poll cached files 42-1, 42-2, 42-3, 42-4, 42-5, and 42-7, which are represented in active file list 62 of FIG. 2B, every thirty seconds, and poll cached files 42-6, 42-8, 42-9, and 42-10, which are represented in the less active file list 66 of FIG. 2B, every three minutes. If it is determined, based on the file stamp(s) (e.g., either the last-accessed or last-modified file stamp) that a file represented in the active file list 62 has been inactive for at least a first predetermined period of time (e.g., three hours), this file can be demoted to less active file list 66. Files represented in less active file list 66 can be polled less frequently than those represented in active file list 62.

For example, in FIG. 2B, cached files 42-6, 42-8, 42-9 and 42-10 can be polled less frequently than cached files 42-1, 42-2, 42-3, 42-4, 42-5, and 42-7. When these less-active cached files are polled, the time stamp(s) for each file can be read to determine if a file has been accessed or modified within a second predetermined period of time. If a cached file from less active file list 66 has remained inactive (e.g., has not been accessed or modified) for at least the second predetermined period of time (e.g., has been less-active for at least five hours), as determined from the time stamp(s) associated with the cached file, the cached file can be removed from cache 18 or, alternatively, can be demoted to a non-active file list 68 (as shown in FIG. 2C). Contrasting FIGS. 2C and 2B, files 42-5 and 42-7 have been demoted to less active status (i.e., file entries 64-5 and 64-7 are included in less active file list 66) and files 42-9 and 42-10 have been demoted to non-active status, (i.e., file entries 64-9 and 64-10 are included in non-active file list 68 because cached files 42-9 and 42-10 have been inactive for longer than the second predetermined period of time). Files listed in non-active file list 68 (e.g., files 42-9 and 42-10) can continue to be polled at an even lower frequency than those in less active file list 66. The files represented in non-active file list 68 can be deleted when they have been inactive for greater than a third predetermined period of time or when nonactive file list 68 exceeds a certain size.

It should be noted that while FIGS. 2A–2C depict three layers of polling (e.g., active, less active, and non-active), there can be more layers, depending on the size of cache 18 and the system requirements of client computer 22. It should be further noted that between FIGS. 2B and 2C, file entry 64-6 has been promoted from less active file list 66 to active file list 62. Promotion from less active status to active status can occur automatically or when polling indicates that a file has been accessed or modified during the second predetermined period of time. Automatic promotion can occur if cache manager 16 monitors cached files 42-1 through 42-10 and determines that a cached file (e.g. cached file 42-6) has been opened. This might occur, for example, if a user opened cached file 42-6 through a file management system 35 (e.g. by double clicking on the file in the Windows™ Explorer interface). Alternatively, cache manager 16 can poll cached file 42-6 and if the last accessed and/or last modified time stamp(s) have changed during the second predetermined period of time, cache manager 16 can promote cached file 42-6 to active status.

The frequency with which active files (e.g., those represented in active file list 62) and less active files (e.g., those represented in less active file list 66) are polled can, in one embodiment of the present invention, be determined as a matter of optimization. Typically, less active files will be polled less often than active files. By doing so, significant system resource savings can be achieved. This occurs because during the highest frequency polling, cache manager 16 only has to poll those files that have recently been active, while less active files can be polled less frequently. If the polling frequency for either active files or for less active files increases, more system resources are required because each cached file 42 in cache 18 must be reviewed more often. However, if the polling frequency of either active files or less active files is too long, latencies can occur (e.g., a period of time may elapse before a file is promoted to active status). In one embodiment of the present invention, the polling interval associated with active files can be on the order of seconds while the polling interval associated with less active files can be on the order of minutes.

In addition to adjusting the polling interval to optimize system resources, the amount of time (e.g., the first and/or second predetermined periods of time) required to trigger demotion to a lower level status (e.g., from active status to less active status, or from less active status to non-active status) can also be tuned to optimize system performance. If these predetermined periods of time (e.g., the first predetermined period of time or second predetermined period of time) are too long, each polling list (e.g., active file list 62 and less active file list 66, respectively) can become too large, thus requiring significant system resources to poll. However, if the first and/or second periods of time are too short, files may be prematurely demoted. Therefore, polling frequencies and the periods of time required to demote files from one status to another can be tuned based on system resources to optimize performance.

FIG. 3 is a flow chart illustrating one embodiment of a method for managing a cache according to the present invention. At step 80, cache manager 16 can poll a recently active file (e.g., cached file 42-1) according to a first schedule or polling frequency. During polling, cache manager 16 can read a time stamp associated with the file. As would be understood by those of ordinary skill in the art, the time stamps can be provided by file management system 35 as attributes of the cached files. At step 82, cache manager 16 can determine if, for example, cached file 42-1 has been accessed or modified within a first predetermined period of time. For example, cache manager 16 can determine if cached file 42-1 has been active within the last thirty minutes by determining the last time, according to the time stamp(s) provided by file management system 35, that cached file 42-1 was either accessed or modified. If at step 82 it is determined that cached file 42-1 has been accessed or modified within the first predetermined period of time, cache manager 16 can continue to poll cached file 42-1 according to the first polling frequency. If, however, at step 82 cache manager 16 determines that cached file 42-1 has not been active for at least the first predetermined period of time, cache manager 16 can demote cached file 42-1 to less active status and, at step 84, poll cached file 42-1 according to a second polling frequency (e.g., second schedule). Typically, for the sake of optimization, the second polling frequency will result in polling of files less often than the first polling frequency.

Cache manager 16, at step 84, can poll cached file 42-1 according to the second polling frequency and determine if cached file 42-1 has been modified and/or accessed, according to the last-modified or last accessed time stamp(s), during the second predetermined period of time. Cache manager 16 can also determine if the cached file has been active within a second predetermined period of time at step 86. If cached file 42-1 has been active during the second predetermined period of time, cache manager 16 can promote cached file 42-1 to active status. Otherwise, cache manager 16 can continue to poll cached file 42-1 according to the second polling frequency. At step 88, cache manager 16, can determine if cached file 42-1 has been inactive (e.g., has not been accessed or modified), for at least the second predetermined period of time (i.e., can determine if the entire second predetermined period of time has elapsed without activity). If cached file 42-1 has not been accessed or modified for at least the second predetermined period of time, cache manager 16 can demote cached file 42-1 to non-active status and maintain cached file 42-1 as non-active (step 90).

At step 91, cache manager 16 can determine if cached file 42-1 has been active (e.g., can poll according to a third schedule or can receive notification from file management system 35) and, if so, can re-promote cached file 16 to active status. Otherwise, at step 92, cache manager 16 can determine whether cached file 42-1 should be removed from cache 18. This decision can be based on whether the number of non-active cached files has exceeded a certain size or if cached file 42-1 has not been accessed for a third predetermined period of time (e.g., cached file 42 has become stale). If at step 92 cache manager 16 determines that cached file 42 should be removed from cache 18, cache manager 16 can delete cached file 42-1 from cache 18 at step 94.

It should be noted that prior to deleting cached file 42-1, cache manager 16 can notify the user that cache manager 16 is going to delete cached file 42-1, so that the user has an opportunity to back up cached file 42-1. If, however, at step 92 cache manager 16 determines that cached file 42-1 should not be removed from cache 18, cache manager 16 can maintain cached file 42-1 in the non-active list. It should be noted that the process shown in FIG. 3 refers to a system in which cache manager 16 maintains an active file list, a less active file list, and an inactive file list. However, it should be understood that additional file lists that correspond to polling at different frequencies can be maintained. In summary, cache manager 16 can poll recently active files at a higher frequency and poll less active files at a lower frequency. If during polling it is determined that an active file has not been active for some predetermined period of time, that file can be demoted to less active status. Conversely, if a less active file has been active as determined by polling according to the second polling frequency, that file can be re-promoted to active status. Additionally, if a less active file has not been active for a second predetermined period of time, that less active file can be demoted to non-active status and can eventually be removed from cache 18. By polling less active files at a lower frequency than more active files, significant system resources can be saved, thereby increasing overall system speed and performance. Additionally, because a cache manager according to the teachings of the present invention does not require detailed contextual information about the files that it is managing, such a cache manager can be easily implemented with any cache.

Embodiments of the present invention have been described in the context of managing cached files associated with database assets by way of example and the embodiments described are not limiting of the scope of the present invention. Embodiments of the present invention are also applicable to managing cached assets such as files, instructions and so on any system in which a cache is used.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the scope of this invention as claimed below.

What is claimed is:

1. A method for managing a cache comprising:
    polling a cached asset according to a first schedule to determine if said cached asset has been active within a first predefined period of time;
    if said cached asset has not been active within said first predefined period of time;
        demoting said cached asset to less-active status;
        polling said cached asset according to a second schedule to determine if said cached asset has been active within a second predefined period of time;
        if said cached asset has not been active within said second predefined period of time, demoting said cached asset to inactive status.

2. The method of claim 1, wherein in the step of polling said cached asset according to said first schedule further comprises processing a timestamp associated with said cached asset.

3. The method of claim 2, wherein said timestamp further comprises a last accessed time stamp.

4. The method of claim 2, wherein said timestamp further comprises a last modified time stamp.

5. The method of claim 1, further comprising if said cached asset has been active within said second predetermined period of time, promoting said cached asset to an active status; and polling said cached asset according to said second schedule to determine if said cached asset has been active since a last polling interval; and
    polling said cached asset according to said first schedule.

6. The method of claim 1, further comprising removing said cached asset from said cache.

7. The method of claim 6, further comprising removing said cached asset from said cache when said cached asset has been inactive for at least third predetermined period of time.

8. The method of claim 6, further comprising removing said cached asset from said cache if a set of inactive cached assets becomes larger than a predefined limit.

9. The method of claim 6, further comprising notifying a user prior to removing said cached asset from said cache.

10. The method of claim 1 wherein polling according to said first schedule occurs at a greater frequency than polling according to said second schedule.

11. The method of claim 1, wherein said second predefined period of time is longer than said first predefined period of time.

12. A method of managing a cache comprising:
    maintaining an active file list of recently active cached files stored in said cache;
    maintaining a less active file list of less active cached files stored in said cache;
    polling a cached file represented in said active file list according to a first schedule to determine if said file has been active within a first predefined period;
    if said cached file has been active within said first predefined period, maintaining a file entry associated with said cached file in said active file list;
    if said cached file has not been active for at least said first predefined period of time:
        demoting said file entry to said less active file list;
        polling said cached file according to a second schedule to determine if said cached file has been active within a second predefined period of time; and
        if said cached file has been active within said second predefined period of time, promoting said file entry to said active file list; and
        if said cached file has not been active for at least a second predefined period of time, removing said file entry from said less active file list.

13. The method of claim 12, further wherein removing said file entry from said less active file list comprises:
    demoting said file entry to a non-active file list, and wherein said method further comprises maintaining said non-active file list; and
    removing said cached file from said non-active file list upon a triggering event.

14. The method of claim 13, wherein the triggering event is the cached file remaining non-active for greater than a third predefined period of time.

15. The method of claim 13, wherein the triggering event is a set of non-active files represented in said non-active file list exceeding a predetermined size.

16. The method of claim 13, further comprising notifying a user prior to removing said cached file from said cache.

17. The method of claim 12, wherein polling according to said first schedule occurs at a greater frequency than polling according to said second schedule.

18. The method of claim 12, further comprising receiving a notification at a cache manager from a file management system that said cached file has been active within the second predefined period of time.

19. The method of claim 12, wherein an attribute for said cached file includes a file time stamp.

20. The method of claim 19, wherein the step of polling said cached file according to said first schedule further comprises comparing said time stamp to a previous time stamp.

21. The method of claim 20, wherein said file time stamp is either a last modified time stamp or a last accessed time stamp.

22. The method of claim 12, wherein the step of polling said cached file according to said second schedule to determine if said cached file has been active within said second predefined period further comprises comparing said file time stamp to a previous time stamp.

23. The method of claim 22, wherein said file time stamp is either a last modified time stamp or a last accessed time stamp.

24. A system of managing a cache comprising a computer readable medium containing a software program executable by a computer processor to:
    maintain a list of cached files;

poll a cached file associated with the list of cached files according to a first schedule to determine if said cached file has been active for at least a first predefined period of time; and if said cached file has not been active within said first predefined period of time;
demote said cached file to a less-active status;
poll said cached file according to a second schedule to determine if said cached file has been active within a second predefined period of time; and
if said cached file has not been active for at least said second predefined period of time, demote said cached file to inactive status.

25. The system of claim 24, wherein said software program is further executable to: if said cached file has been active within the second predetermined period of time, poll said cached file according to said first schedule to determine if said cached file has been active within said first predetermined period of time.

26. The system of claim 24, wherein said software program is further executable to remove said cached file from said cache.

27. The system of claim 26, wherein said software program is further executable to notify a user prior to removing said associated file from said cache.

28. The system of claim 24, wherein polling said file entry according said first schedule occurs at a greater frequency than polling according to said second schedule.

29. The system of claim 24, wherein said software program is further executable to receive a notification from a file management system that said cached file has been active.

30. The system of claim 24, wherein a file attribute for said cached file includes a file time stamp.

31. The system of claim 30, wherein the step of polling said cached file according to said first schedule to determine if said cached file has been active within said first predefined period further comprises comparing said file time stamp to a previous time stamp.

32. The system of claim 31, wherein said file time stamp is either a last modified time stamp or a last accessed time stamp.

33. The system of claim 32, wherein the step of polling said file entry according to said second schedule to determine if said associated file has been active within said second predefined period further comprises comparing said file time stamp to a previous time stamp.

34. The system of claim 24, wherein said software program is further executable to:
determine if said cached file has been active within said second predetermined period of time;
if said cached file has been active within said predetermined period of time, polling said cached file according to said first schedule.

35. A method for managing a cache comprising:
polling a cached file according to a first schedule to determine if said cached file has been active within a first predefined period of time;
if said cached file has not been active within said first predefined period of time;
demoting said cached file to less-active status;
polling said cached file according to a second schedule to determine if said cached file has been active within a second predefined period of time;
if said cached file has not been active within said second predefined period of time, demoting said cached file to inactive status.

36. The method of claim 35, wherein in the step of polling said cached file according to said first schedule further comprises processing a timestamp associated with said cached file.

37. The method of claim 36, wherein said timestamp further comprises a last accessed time stamp.

38. The method of claim 36, wherein said timestamp further comprises a last modified time stamp.

39. The method of claim 35, further comprising if said cached file has been active within said second predetermined period of time, promoting said cached file to an active status; and polling said cached file according to said second schedule to determine if said cached file has been active since a last polling interval; and
polling said cached file according to said first schedule.

40. The method of claim 35, further comprising removing said cached file from said cache.

41. The method of claim 40, further comprising removing said cached file from said cache when said cached file has been inactive for at least third predetermined period of time.

42. The method of claim 40, further comprising removing said cached file from said cache if a set of inactive cached files becomes larger than a predefined limit.

43. The method of claim 40, further comprising notifying a user prior to removing said cached file from said cache.

44. The method of claim 35 wherein polling according to said first schedule occurs at a greater frequency than polling according to said second schedule.

45. The method of claim 35, wherein said second predefined period of time is longer than said first predefined period of time.

* * * * *